United States Patent
Bahramzy

(10) Patent No.: US 8,855,724 B2
(45) Date of Patent: Oct. 7, 2014

(54) HEARING AID COMPLIANT MOBILE HANDSET

(75) Inventor: Pevand Bahramzy, Taastrup (DK)

(73) Assignee: Molex Incorporated, Lisle, IL (US)

( * ) Notice: Subject to any disclaimer, the term of this patent is extended or adjusted under 35 U.S.C. 154(b) by 476 days.

(21) Appl. No.: 13/130,235

(22) PCT Filed: Nov. 23, 2009

(86) PCT No.: PCT/US2009/065448
§ 371 (c)(1),
(2), (4) Date: Aug. 4, 2011

(87) PCT Pub. No.: WO2010/065356
PCT Pub. Date: Jun. 10, 2010

(65) Prior Publication Data
US 2012/0094717 A1    Apr. 19, 2012

Related U.S. Application Data

(60) Provisional application No. 61/117,840, filed on Nov. 25, 2008.

(51) Int. Cl.
 H04B 1/38    (2006.01)
 H01Q 1/24    (2006.01)
 H01Q 1/52    (2006.01)
 H01Q 9/42    (2006.01)
 H04W 88/02   (2009.01)

(52) U.S. Cl.
 CPC .............. H01Q 1/245 (2013.01); H04W 88/02 (2013.01); H01Q 1/243 (2013.01); H01Q 1/52 (2013.01); H01Q 9/42 (2013.01)

USPC ..... 455/570; 455/557; 455/575.1; 455/575.5; 455/575.6; 455/90.3; 343/700 R; 343/702; 343/787

(58) Field of Classification Search
 CPC ......... H01Q 1/243; H01Q 1/52; H01Q 15/00; H04W 88/02
 USPC .................. 455/90.3, 557, 570, 575.1, 575.5, 455/575.6; 343/700, 702, 787
 See application file for complete search history.

(56) References Cited

U.S. PATENT DOCUMENTS

| | | | |
|---|---|---|---|
| 6,198,441 B1* | 3/2001 | Okabe et al. | 343/702 |
| 6,266,019 B1* | 7/2001 | Stewart et al. | 343/702 |
| 6,873,294 B1* | 3/2005 | Anderson et al. | 343/702 |
| 6,987,486 B2* | 1/2006 | Kurjenheimo et al. | 343/702 |

(Continued)

FOREIGN PATENT DOCUMENTS

| | | |
|---|---|---|
| EP | 1 172 884 A2 | 1/2002 |
| EP | 1 583 172 A2 | 10/2005 |

(Continued)

*Primary Examiner* — Olumide T Ajibade Akonai
(74) *Attorney, Agent, or Firm* — Stephen L. Sheldon

(57) ABSTRACT

A hearing aid compatible mobile handset is provided with a parasitic element which is electrically connected to a groundplane of a circuit board. The parasitic element may have a length of around one-quarter wavelength of a frequency of interest. The parasitic element may be are arranged as a pair of parasitic elements. The parasitic element can be disposed in a location where the near field strength is near a peak so as to help reduce the near field level to a point that will allow operation of the handset adjacent a hearing aid.

17 Claims, 3 Drawing Sheets

(56) References Cited

U.S. PATENT DOCUMENTS

| | | |
|---|---|---|
| 7,394,430 B2 * | 7/2008 | Poilasne et al. ............... 343/702 |
| 2002/0075187 A1 * | 6/2002 | McKivergan ................ 343/702 |
| 2003/0169206 A1 | 9/2003 | Egawa |
| 2004/0041733 A1 * | 3/2004 | Milosavljevic ........ 343/700 MS |
| 2004/0214531 A1 * | 10/2004 | Tomatsu .......................... 455/95 |
| 2006/0033667 A1 * | 2/2006 | Johnson ....................... 343/702 |
| 2006/0035607 A1 * | 2/2006 | Hayes et al. ................. 455/117 |
| 2007/0069957 A1 * | 3/2007 | Ranta .................... 343/700 MS |
| 2008/0252536 A1 | 10/2008 | Anguera et al. |
| 2009/0051611 A1 * | 2/2009 | Shamblin et al. ............. 343/747 |

FOREIGN PATENT DOCUMENTS

| | | |
|---|---|---|
| EP | 1 763 145 A1 | 3/2007 |
| WO | WO 03/067702 A2 | 8/2003 |
| WO | WO 2005/018046 A1 | 2/2005 |

* cited by examiner

US 8,855,724 B2

HEARING AID COMPLIANT MOBILE HANDSET

REFERENCE TO RELATED APPLICATIONS

This application is a national phase of PCT Application No. PCT/US09/65448, filed Nov. 23, 2009, which in turn claims priority to U.S. Provisional Application No. 61/117,840, filed Nov. 25, 2008, which is incorporated herein by reference in its entirety.

BACKGROUND OF THE INVENTION

The present invention relates to mobile devices, and more particularly, to mobile devices that are hearing aid compatible.

Mobile devices such as mobile handsets have been known for years and have been widely adopted throughout the world as a convenient and cost effective way of communication. As the current generations become older, the percentage of older people using a mobile handset has increased. These older individuals tend to have a greater occurrence of hearing-related problems and therefore more frequently posses and utilize hearing aids to assist them in their hearing. Hearing aids are small battery-operated devices that typically sit in a user's ear. A hearing aid is equipped with a microphone and an amplifier and helps the user hear by amplifying sound that would otherwise be too quiet for the user to properly perceive. Although a hearing aid is helpful to its user, hearing aids can emit noises such as buzzing noises when exposed to electromagnetic fields with sufficient strength such that the field stimulates the voice coil of the microphone.

In the past, most mobile handsets operated over an analog network and the electromagnetic field generated by the analog network was not particularly problematic. Most, if not all of the mobile handset handsets on the market today, however, are configured to operate over a digital network because of the benefits of such a network. The use of mobile handsets over a digital network can create a problem with a segment of the mobile handset market that uses hearing aids. Each mobile handset emanates an electromagnetic field as it communicates over the network. In a digital network, the electromagnetic field pulses and these pulses, if of sufficient strength, may stimulate the voice coil of the hearing aid. Such stimulation can create a disturbing buzzing sound that can prevent a user with a hearing aid from reliably using a mobile handset.

Conventional solutions to this problem such as a neck-loop or special headset, while potentially effective, are more costly and less convenient. Therefore, there is interest in a mobile device that works in a digital network and is also compatible with hearing aid users. A mobile handset that achieves this could be designated as hearing aid compatible or compliant ("HAC"), which is a desirable feature for a number of potential users. Consequentially, systems to provide such a feature would be desirable to certain individuals.

SUMMARY OF THE INVENTION

In an embodiment, a mobile device is configured to operate in a digital network. The mobile device includes a circuit board with a ground plane and the mobile device includes an antenna that generates an electromagnetic near field and far field. An inverted L parasitic element is coupled to the ground plane. In an embodiment, the parasitic element can be configured to have a length of one-quarter wavelength of a frequency of interest. In an embodiment, the parasitic element may be coupled to an inductor so as to reduce the length of the parasitic element.

DETAILED DESCRIPTION OF THE INVENTION

Figure 1:
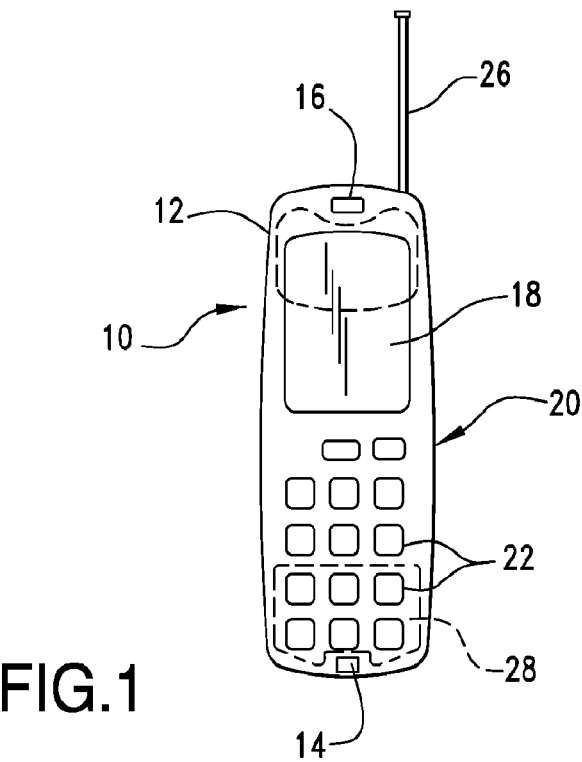
FIG. 1 is an elevational view of a conventional mobile handset.

The detailed description that follows describes exemplary embodiments and is not intended to be limited to the expressly disclosed combination(s). Therefore, unless otherwise noted, features disclosed herein may be combined together to form additional combinations that were not otherwise shown for purposes of brevity.

In general, when a mobile device such as a mobile handset is operated in a digital network, the mobile handset generates electromagnetic field pulses that have two components, one of which is a magnetic field and the other of which is an electrical field. The electromagnetic field pulses can be picked up by the voice coil of the hearing aid when the mobile handset is brought close to the hearing aid, thus creating a buzzing sound. Therefore, people that have hearing impairments and that use hearing aids may be unable to use digital mobile handsets.

To address this, a mobile handset may be configured to be hearing aid compatible (HAC) at both high and low frequency bands. The mobile handset may utilize a parasitic element within the handset body that at least partially reduces the electromagnetic field generated by the handset. The parasitic element can have a length of about one-quarter wave of a frequency of interest. The use of the parasitic element imposes a re-distribution of the near field over the handset surface and can provide a reduced level such that operation of the handset in a digital network does not interfere with a hearing aid. The mobile handset can include a parasitic element in the form of an inverted L member coupled, which may be configured and positioned so as to fit the handset while providing the desired near field reduction.

In particular, as the interference is caused by the electromagnetic field generated by the mobile handset (or any other similar mobile device used over a similar network), a way to reduce the electromagnetic field has been discovered. Notably, in the near field ("NF") region the two field components, namely the magnetic and electrical field, are less strongly coupled together. Therefore, each of these fields can be measured separately to determine the effectiveness of attempts to reduce the field strength. The near field extends across the face of the mobile handset and therefore affects, or negatively impacts the operation of the hearing aid. Therefore, decreasing either or both of the magnetic and electrical components of the near field is helpful to lessen the impact of the near field on a hearing aid.

Testing was conducted with respect to two commercially available mobile handsets, a NOKIA model N81 and a NOKIA model 6600. Evaluations of these two handsets were made within the GSM850 and PCS1900 frequency bands, which are commonly used in the United States. As can be appreciated, however, the invention is not limited to a particular handset or a particular frequency range but instead has broad application to any mobile device operating in a digital network. Furthermore, while the two depicted handsets are of a sliding design, the depicted features would be suitable for other configurations, including but not limited to clamshell handsets or bar-like handsets.

FIG. 1 illustrates a conventional mobile handset 10. The handset 10 has housing 12 in which various components are supported such as printed wiring board, a microphone 14, a speaker 16, a visual display panel 18, a keypad 20 with selective keys 22. The handset commonly includes an antenna which may be of the external pull out type 26 or an internal type 28 that is totally enclosed within the handset case 12.

Figures 2, 3:
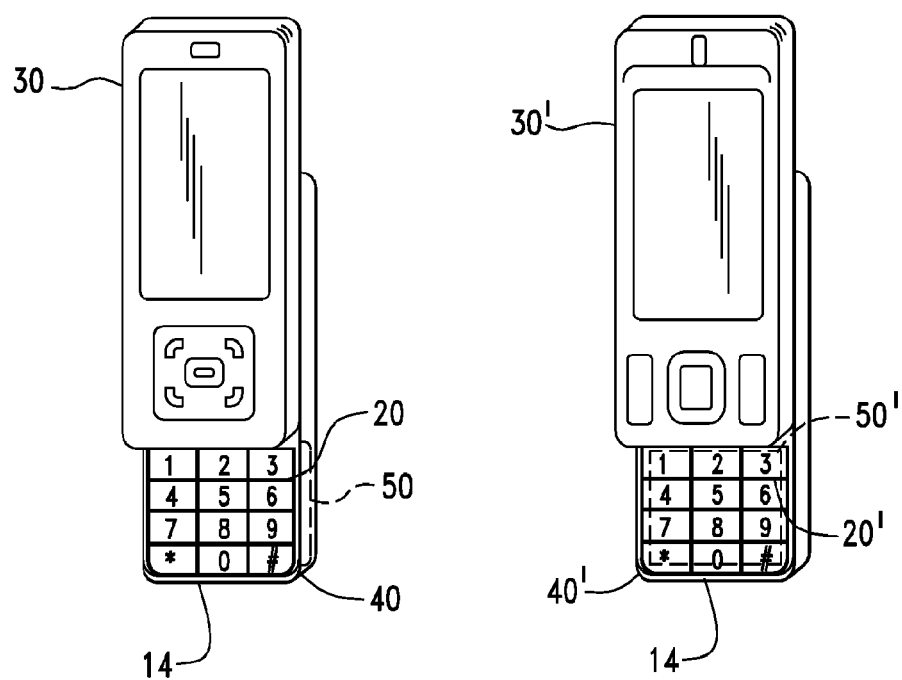
FIG. 2 is a perspective view of a Nokia N81 mobile handset.
FIG. 3 is a perspective view of a Nokia 6600 mobile handset.

FIGS. 2 and 3 respectively illustrate a NOKIA N81 and a NOKIA 6600 mobile handset. Each handset is of the slide-style construction, meaning that a top or first portion 30, 30' slides relative to a bottom or second portion 40, 40' so as to expose a keypad 20, 20' of each handset for access by a user. It should be noted that any type of keypad might be provided, including numeric and/or QUERTY type keyboards. The microphone 14 is located in the second portion 40, 40' and an internal antenna 50, 50', which may be sized and located as appropriate and is used for transmitting and receiving signals, is also located in the second portion 40, 40'.

Figure 4:
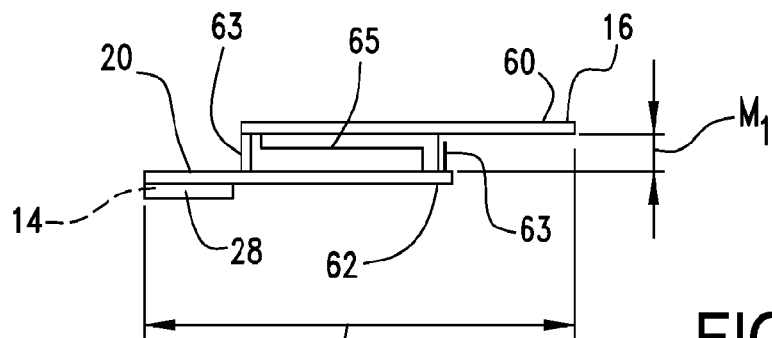
FIG. 4 is a schematic view of a mobile handset.

FIG. 4 is a schematic design illustrating certain internal components of the handsets depicted in FIGS. 2 and 3. Two printed circuit boards 60, 62 are provided and they can be slidable with respect to each other. A first circuit board 60 is typically referred to as a display board inasmuch as it supports the visual display 18 and its associated components, which a second circuit board is referred to as an engine board as it supports the handset key pad, antenna and other circuitry.

The two circuit boards 60, 62 are connected, or "shorted" together at one or more locations by shorting member 63. The first and second circuit board 60, 62 are further interconnected by a length of flexible printed circuitry 65. The two wiring boards are further separated by a spacing, $H_1$ (FIG. 4) that defines a preferred space to position certain features described herein.

As noted above, mobile devices operating in a digital network generate an electromagnetic field during operation. Such electromagnetic fields have two separate components. One is an electrical field that is measured in volts/meter (v/m) and is proportional to the applied voltage between two spaced apart conductors. The other component is a magnetic field that is generated around conductors carrying a current and is measured in amperes/meter (A/m). The electromagnetic field has both a far field component and a near field component. It is the near field component that causes the undesirable interference with a microphone of a hearing aid and the disclosure provided herein is primarily directed at reducing the strength and intensity of the near field.

It has been found that the mobile handsets designs depicted have a field current distribution that is very similar to a half wavelength dipole with minimal current at the ends and maximum current at the center. This center approaches the center C of the length of the two printed wiring boards when extended fully as shown in the FIG. 4 diagram. For other handset designs, however, the location of the maximum current may be elsewhere and the location can be readily determined by testing the handset.

The NOKIA N81 handset examined herein uses a planar inverted-F antenna while the NOKIA 6600 handset uses a monopole antenna. These antennas produce the electrical field (E field) and magnetic (H field) fields in operation.

|                | Nokia N81      |              | Nokia 6600     |              |
|----------------|----------------|--------------|----------------|--------------|
| Frequency Band | E Field (V/m)  | H Field (A/m)| E Field (V/m)  | H Field (A/m)|
| GSM 850        | 122.5          | 0.119        | 249            | 0.260        |
| GSM 900        | 228.3          | 0.259        | 231            | 0.257        |
| DCS 1800       | 122.7          | 0.248        | 136            | 0.315        |
| PLS 1900       | 100.8          | 0.212        | 139            | 0.336        |

The hearing aid compatible ("HAC") standard for low band frequencies below 960 MHz is 266.1 V/m for E field and 0.8 A/m for the H field. The HAC standard for high band frequencies above 960 MHz is 84.1 V/m and 0.254 A/m. As can be appreciated, therefore, the representative handsets produce an electrical and magnetic field that falls within the guidelines for HAC low band operation but fall outside the guidelines for HAC high band operation. Therefore, it is desirable to reduce the electromagnetic field associated with the high band in these handsets. Testing is generally required to determine whether a particular handset falls within the guidelines so that a solution can be tailored for that handset.

Figure 5:
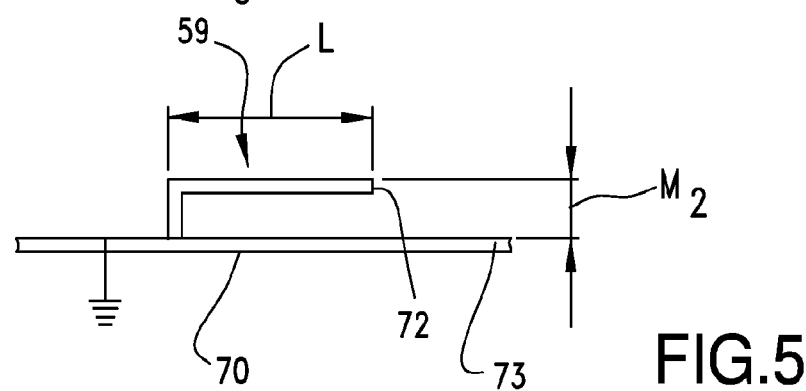
FIG. 5 is a side elevational view of an embodiment of a parasitic element.
Figure 10:
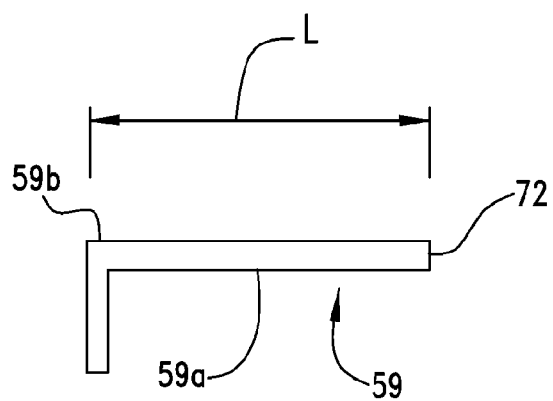
FIG. 10 is a simplified representation of an embodiment of a parasitic element.

It has been discovered that by positioning in the body of the mobile handset an inverted L-parasitic radiator element 59, it is possible to significantly reduce the strength of the electrical and magnetic components of the near electromagnetic field generated. Embodiments of such an inverted L radiator are illustrated in FIGS. 5 and 10, and it can be seen to have a height $H_2$ and a length L. The parasitic element 59 is electrically conductive (e.g., it may be constructed similar to how antennas are typically formed) and has a body 59a with a coupled portion 59b electrically connected to a groundplane 70 and it has an end 72 that extends in a cantilevered manner over its supporting base 73 a distance (giving the parasitic element a body with a length that extends from the coupled portion). The groundplane 70 may be disposed on a top or bottom surfaces of the supporting base 73 or it may be embedded therein (e.g., it may be an internal layer). The supporting base 73 may be the corresponding circuit board or another layer connected thereto. As depicted, therefore, the parasitic element is not electrically connected to any transmitter or receiver and instead is only electrically connected to the groundplane, either directly or via an inductor.

Figure 6:
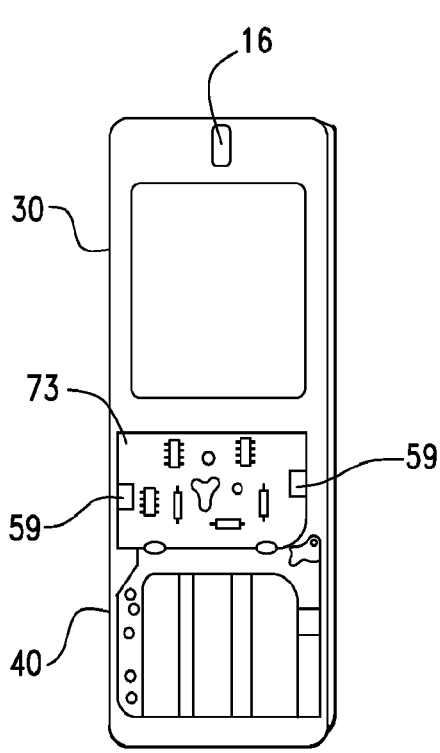
FIG. 6 is a view of a Nokia N81 mobile handset of FIG. 2 with the housing omitted to illustrate internal features.
Figure 7:
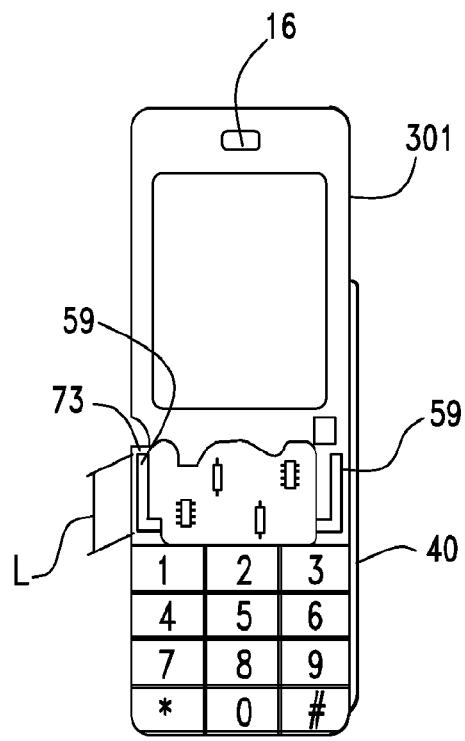
FIG. 7 is a view of a Nokia 6600 mobile handset of FIG. 3 with the housing omitted to illustrate internal features.

It is desirable to place the parasitic element 59 in the mobile handset at the location where the magnetic (H) field is the strongest. In the depicted handsets, it was observed that the magnitude of H field of the depicted handsets was at a peak near the center C of the length of the handset and therefore the parasitic element 59 was located on the engine board 62 at approximately the centerline of the length. For other handsets, however, the location of the peak could be somewhere else or there may be multiple peaks, thus it may be determined that the location is near a local peak rather than a absolute peak. It should be noted that in an embodiment a pair of parasitic elements 59 may be used, and each parasitic element 59 can be positioned along opposing sides of the handset, such as is depicted in FIGS. 6 and 7.

The length L of the parasitic element is preferably a one-quarter wavelength. This quarter wavelength is calculated by the following formula:

$$\lambda = c/f, \text{ where } c = \text{speed of light and } f = \text{operating frequency}$$
$$= 300,000,000 \text{ m/s}/1880 \text{ MHz}$$
$$= 0.1595 \text{ m}$$
$$\lambda/4 = 0.1595 \text{ m}/4$$
$$= 39.8 \text{ mm}$$

Figure 8:
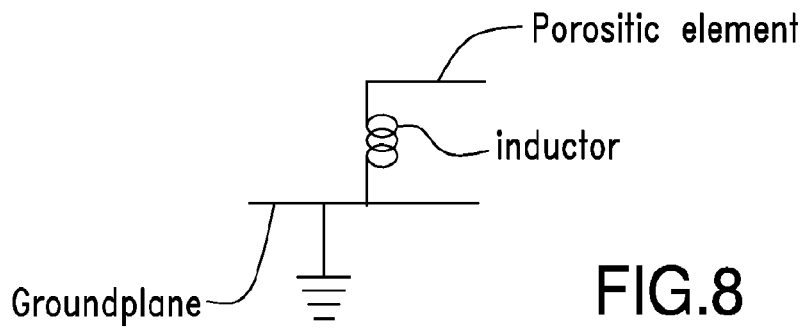
FIG. 8 is a schematic diagram of the parasitic element in series with an inductor.

This indicates that, if the high frequencies are of more interest, a 40 mm long parasitic element 59 is desired. In practice, such a length may be impracticable and therefore it may be desirable to reduce the length of the parasitic element 59. To provide a reduced length parasitic element, the parasitic element 59 can be coupled with an inductor, which in an embodiment can be a 12 nh inductor, and arranged in series as depicted schematically in FIG. 8. By coupling the parasitic element 59 in series with the 12 nh inductor, for example, the length of the parasitic element can be reduced to about 12 mm. In general, the use of the inductor allows the parasitic element to be reduced to less than 20 mm, which is much easier to package.

As can be appreciated, when the length L of the parasitic element 59 is reduced to 12 mm, it can also be installed on the first circuit board 60 as well as in the second circuit board 62 when the handset is oriented as shown in FIGS. 6 and 7. For example, the reduced length configuration helps reduce the distance the parasitic element 59 extend into the area normally taken up by the display 16. Thus, significant flexibility in locating the parasitic element 59 is possible and the parasitic element 59 can even be positioned in handsets where there is a single circuit board. Tests were run on the NOKIA N81 and 6600 handsets using a pair of parasitic elements with the reduced length and the electromagnetic field components were measured:

| Frequency 1880 MHz | N81 E field (V/m) | [dB] | N81 H field (A/m) | [dB] | 6600 E field (V/m) | [dB] | 6600 H field (A/m) | [dB] |
|---|---|---|---|---|---|---|---|---|
| Before | 100.8 | 40.1 | 0.212 | −13.5 | 139 | 42.9 | 0.336 | −9.5 |
| After | 60.2 | 35.6 | 0.124 | −18.1 | 69.4 | 36.8 | 0.117 | −18.6 |
| reduction | 40.3% | 4.5 dB | 41.5% | 4.6 dB | 50.1% | 6.1 dB | 65.2% | 9.1 dB |

Thus, as can be appreciated, the parasitic elements significantly reduced the strength of the components of the electromagnetic fields generated by the NOKIA N81 and 6600 mobile handsets for an actual call made to these handsets. Consequentially, with the parasitic elements the handsets met the HAC guidelines and would likely be suitable for use by users that also used hearing aids. If the mobile device has a slider configuration, preferably the height $H_2$ of the parasitic element is less than two (2) mm, and most preferably about one (1) mm so that it can fit in the spacing $H_1$.

Figure 9:
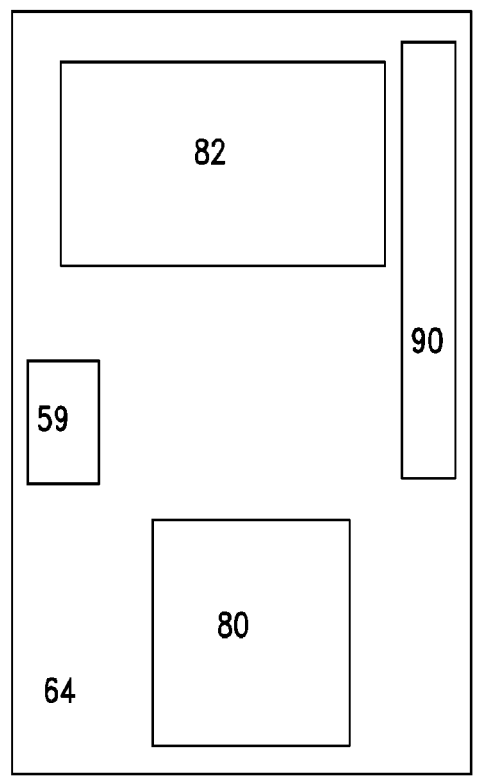
FIG. 9 is a schematic illustration of an embodiment of a circuit board.

FIG. 9 is a schematic illustration of an exemplary circuit board 64 that may be provided in a handset (which, as noted above, will typically include a housing, display, a speaker and a microphone). The circuit board 64 supports a communication engine 80, a display engine 82 and an antenna 90. It should be noted that the engines may be combined if desired and there is significant flexibility in how the circuit board 64 is configured. For example, while it is shown as a single board, it could also be split into multiple boards that were coupled together. Similarly, the antenna 90 can be any desirable antenna configuration and may even be a combination of two or more antennas that are each configured to operate in a particular frequency. In general, the use of antennas and matching networks to provide the desired frequency response is known and more regarding these features is not discussed herein for purposes of brevity. The circuit board supports a parasitic element 59, which is, as noted above, preferably located near a location where the magnetic near field is at a peak. If the region where the magnetic field is at a peak is not available due to the need to position other components, positioning the parasitic element 59 reasonably close to that peak may be enough to allow the near field levels to be reduced to a point that is acceptable for most users.

The present invention has been described in terms of preferred and exemplary embodiments thereof. Numerous other embodiments, modifications and variations within the scope and spirit of the appended claims will occur to persons of ordinary skill in the art from a review of this disclosure.

The invention claimed is:

1. A mobile handset, comprising:
   a housing;
   a circuit board supported by the housing, the circuit board including a groundplane;
   an antenna configured to operate in a digital network; and
   a parasitic element including a body that includes a coupled portion and an end, the coupled portion electrically coupled to the groundplane and the end extending a length from the coupled portion in a direction that is substantially parallel to the groundplane, the length being less than 50 mm and the parasitic element being coupled to the groundplane wherein the parasitic element is configured to reduce the magnetic near field by at least 25% for frequencies about 1880 MHz.

2. The mobile handset of claim 1, wherein the parasitic element has an inverted L shape.

3. The mobile handset of claim 2, wherein the first end is coupled to the groundplane via an inductor, the inductor being in series between the coupled portion and the groundplane.

4. The mobile handset of claim 3, wherein the length is less than 15 mm.

5. The mobile handset of claim 2, wherein the body is position a distance away from the groundplane, the distance being less than about 2 mm.

6. The mobile handset of claim 1, wherein the parasitic element is positioned on the circuit board so as to be in close proximity to a near field peak level when the handset is in operation.

7. A circuit board, comprising:
   a groundplane;
   a parasitic element with a body, a coupled portion and an end, the end extending from the coupled portion a distance that is less than 50 mm and the coupled portion electrically connected to the ground plane, the parasitic element being coupled to the groundplane approximate at a peak magnetic near field location, wherein the parasitic element is configured to reduce the magnetic near field by at least 25% for frequencies about 1880 MHz.

8. The circuit board of claim 7, wherein the coupled portion is electrically connected to the groundplane via an inductor.

9. The circuit board of claim 7, wherein the parasitic element is not electrically connected to anything but the groundplane, the connection being via an inductor.

10. The circuit board of claim 7, wherein the coupled portion is connected to the groundplane via an inductor and the end extends from the coupled portion a distance that is less than 20 mm.

11. The circuit board of claim 7, wherein the parasitic element is not electrically connected to anything but the groundplane.

12. A mobile handset, comprising:
a first and second circuit board, one of the first and second circuit board supporting a handset display element and the other of the first and second circuit board supporting a handset engine, the first and second circuit boards being moveable with respect to each other between first and second operative positions, the first circuit board including a ground plane and being further supported by a spacing which defines an internal clearance between the first and second circuit board; and
a parasitic element disposed on the first circuit board, the parasitic element including a coupled portion being electrically connected to the groundplane and having a free end to define a radiating element with a length, the parasitic element being disposed approximately halfway between opposing ends of the mobile handset, wherein the parasitic element is configured to reduce the magnetic near field by at least 25% for frequencies about 1880 MHz.

13. The mobile handset of claim 12, wherein the parasitic element has an inverted-L configuration.

14. The mobile handset of claim 12, wherein the parasitic element has a length that is less than about 40 mm.

15. The mobile handset of claim 14, wherein the parasitic element has a length of less than about 13 mm.

16. The mobile handset of claim 12, wherein the parasitic element is electrically connected to the groundplane via an inductor.

17. The mobile handset of claim 12, wherein the parasitic element is coupled to the groundplane such that, in operation, the parasitic element is positioned approximately at a peak magnetic near field location.

* * * * *